(12) United States Patent
Jiang et al.

(10) Patent No.: US 11,438,776 B2
(45) Date of Patent: Sep. 6, 2022

(54) CONTROL CHANNEL MONITORING METHOD, MONITORING INDICATION METHOD, USER EQUIPMENT AND NETWORK DEVICE

(71) Applicant: VIVO MOBILE COMMUNICATION CO., LTD., Guangdong (CN)

(72) Inventors: Dajie Jiang, Guangdong (CN); Xueming Pan, Guangdong (CN); Xiaodong Shen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 140 days.

(21) Appl. No.: 16/957,144

(22) PCT Filed: Nov. 23, 2018

(86) PCT No.: PCT/CN2018/117146
§ 371 (c)(1),
(2) Date: Jun. 23, 2020

(87) PCT Pub. No.: WO2019/128578
PCT Pub. Date: Jul. 4, 2019

(65) Prior Publication Data
US 2021/0368367 A1    Nov. 25, 2021

(30) Foreign Application Priority Data

Dec. 25, 2017  (CN) .......................... 201711422770.5

(51) Int. Cl.
*H04W 72/04*     (2009.01)
*H04W 24/08*     (2009.01)
*H04W 72/14*     (2009.01)

(52) U.S. Cl.
CPC .......... *H04W 24/08* (2013.01); *H04W 72/042* (2013.01); *H04W 72/0446* (2013.01); *H04W 72/0453* (2013.01); *H04W 72/14* (2013.01)

(58) Field of Classification Search
CPC . H04W 24/08; H04W 72/044; H04W 72/042; H04W 72/14; H04W 72/0453;
(Continued)

(56) References Cited

U.S. PATENT DOCUMENTS

2013/0294318 A1* 11/2013 Amerga ................ H04W 4/06
                                                               370/312
2015/0117271 A1*  4/2015 Liang .................... H04L 5/001
                                                               370/280
(Continued)

FOREIGN PATENT DOCUMENTS

CN     102811192 A    12/2012
CN     105722239 A     6/2016
(Continued)

OTHER PUBLICATIONS

Office Action dated Mar. 4, 2020 issued in Chinese Application No. 201711422770.5.
(Continued)

*Primary Examiner* — Wei Zhao
(74) *Attorney, Agent, or Firm* — Brooks Kushman P.C.

(57) ABSTRACT

A control channel monitoring method, a monitoring indication method, a terminal and a network device are provided. The control channel monitoring method includes: acquiring indication information for a PDCCH monitoring periodicity, the indication information including a first PDCCH monitoring periodicity; monitoring the first PDCCH in a monitoring slot belonging to the first PDCCH monitoring periodicity; and when the first PDCCH is not detected in the monitoring slot belonging to the first PDCCH monitoring
(Continued)

periodicity, monitoring the PDCCH in a next slot including a PDCCH resource set; or when the indication information further includes a second PDCCH monitoring periodicity and the first PDCCH is not detected in the monitoring slot belonging to the first PDCCH monitoring periodicity, monitoring a second PDCCH in a monitoring slot belonging to the second PDCCH monitoring periodicity.

20 Claims, 7 Drawing Sheets

(58) Field of Classification Search
CPC ......... H04W 72/0446; H04W 72/0413; H04W 52/146; H04W 52/365
See application file for complete search history.

(56) References Cited

U.S. PATENT DOCUMENTS

| | | | |
|---|---|---|---|
| 2019/0045532 A1 | 2/2019 | Zhu et al. | |
| 2019/0082453 A1 | 3/2019 | Lyu et al. | |
| 2020/0389847 A1* | 12/2020 | Deng | H04B 7/0617 |

FOREIGN PATENT DOCUMENTS

| | | |
|---|---|---|
| CN | 107370562 A | 11/2017 |
| WO | 2013127076 A1 | 9/2013 |
| WO | 2016163656 A1 | 10/2016 |
| WO | 2017193268 A1 | 11/2017 |

OTHER PUBLICATIONS

3GPP TSG-RAN2 Meeting #100, R2-1713018, "Dynamical Adjustment for NPDCCH period in RRC_Connected connected for UE power saving", Reno Nevada, USA, Nov. 27-Dec. 1, 2017, 6 pages.
International Preliminary Report on Patentability dated Jul. 9, 2020 issued in PCT/CN2018/117146.

* cited by examiner

CONTROL CHANNEL MONITORING METHOD, MONITORING INDICATION METHOD, USER EQUIPMENT AND NETWORK DEVICE

CROSS-REFERENCE TO RELATED APPLICATION

The present application is the U.S. national phase of PCT Application No. PCT/CN2018/117146 filed on Nov. 23, 2018, which claims a priority of the Chinese patent application No. 201711422770.5 filed on Dec. 25, 2017, which is incorporated herein by reference in its entirety.

TECHNICAL FIELD

The present disclosure relates to the field of communication technology, in particular to a control channel monitoring method, a monitoring indication method, a user equipment (UE) and a network device.

BACKGROUND

In 4G and New Radio (NR) systems, generally, a terminal performs blind detection on a Physical Downlink Control Channel (PDCCH) in each sub-frame or slot. If a PDCCH belonging to the terminal is received, the terminal receives downlink data or transmits uplink data on a time-frequency resource indicated by the PDCCH. If no PDCCH belonging to the terminal is received, the terminal performs PDCCH blind detection in the next sub-frame or slot.

Because of randomness or non-uniformity of arrival times of different service packets, in an actual network, when a terminal is in an active state and continuously monitoring the PDCCH, the terminal does not receive a PDCCH belonging to the terminal in each sub-frame or slot, and the processing of terminal blindly detecting the PDCCH in these sub-frames or slots actually consumes power and the terminal does not receive real data.

To solve this problem, a periodic PDCCH monitoring is introduced, that is, the PDCCH is monitored once in every few slots or Orthogonal Frequency Division Multiplexing (Orthogonal Frequency Division Multiplexing, OFDM) symbols, so that power consumption of a terminal for frequently detecting the PDCCH can be saved. However, it is difficult for the base station to select an appropriate PDCCH monitoring periodicity for each service of each terminal due to randomness of arrival of service packets and randomness of error of service packets, so that the terminal cannot receive and monitoring all PDCCHs, and information loss is caused.

SUMMARY

The present disclosure is implemented as follows.

In the first aspect, the present disclosure provides in some embodiments a PDCCH monitoring method, including: acquiring indication information for a PDCCH monitoring periodicity, wherein the indication information comprises a first PDCCH monitoring periodicity; monitoring the first PDCCH in a monitoring slot belonging to the first PDCCH monitoring periodicity; and when the first PDCCH is not detected in the monitoring slot belonging to the first PDCCH monitoring periodicity, monitoring the PDCCH in a next slot including a PDCCH resource set; or when the indication information further includes a second PDCCH monitoring periodicity and the first PDCCH is not detected in the monitoring slot belonging to the first PDCCH monitoring periodicity, monitoring a second PDCCH in a monitoring slot belonging to the second PDCCH monitoring periodicity.

In the second aspect, the present disclosure provides in some embodiments a PDCCH monitoring indication method, including: sending downlink control information (DCI) on PDCCH based on indication information for a PDCCH monitoring periodicity, wherein the indication information includes a first PDCCH monitoring periodicity; or the indication information includes a first PDCCH monitoring periodicity and a second PDCCH monitoring periodicity, when the indication information further includes the second PDCCH monitoring periodicity, the second PDCCH monitoring periodicity is used to enable a terminal to monitor a second PDCCH in a monitoring slot belonging to the second PDCCH monitoring periodicity when the terminal does not detect a first PDCCH in a monitoring slot belonging to the first PDCCH monitoring periodicity.

In the third aspect, the present disclosure provides in some embodiments a terminal, including: an acquiring module, configured to acquire indication information for a monitoring periodicity of a PDCCH, wherein the indication information includes a first PDCCH monitoring periodicity; a first monitoring module, configured to monitor a first PDCCH in a monitoring slot belonging to the first PDCCH monitoring periodicity; and a second monitoring module, configured to, when the first PDCCH is not detected in the monitoring slot belonging to the first PDCCH monitoring periodicity, monitoring the PDCCH in a next slot including a PDCCH resource set; or when the indication information further includes a second PDCCH monitoring periodicity and the first PDCCH is not detected in the monitoring slot belonging to the first PDCCH monitoring periodicity, monitoring a second PDCCH in a monitoring slot belonging to the second PDCCH monitoring periodicity.

In the fourth aspect, the present disclosure provides in some embodiments a terminal, including a memory, a processor, and a computer program stored in the memory and executed by the processor, wherein the processor is configured to execute the computer program so as to implement the PDCCH monitoring method.

In the fifth aspect, the present disclosure provides in some embodiments a computer-readable storage medium storing therein a computer program, wherein the computer program is executed by a processor so as to implement the PDCCH monitoring method.

In the sixth aspect, the present disclosure provides in some embodiments a network device, including a first sending module, configured to send downlink control information (DCI) on PDCCH based on indication information for a PDCCH monitoring periodicity, wherein the indication information includes a first PDCCH monitoring periodicity; or the indication information includes a first PDCCH monitoring periodicity and a second PDCCH monitoring periodicity, when the indication information further includes the second PDCCH monitoring periodicity, the second PDCCH monitoring periodicity is used to enable a terminal to monitor a second PDCCH in a monitoring slot belonging to the second PDCCH monitoring periodicity when the terminal does not detect a first PDCCH in a monitoring slot belonging to the first PDCCH monitoring periodicity.

In the seventh aspect, the present disclosure provides in some embodiments a network device, including a memory, a processor, and a computer program stored in the memory and executed by the processor, wherein the processor is configured to execute the computer program so as to implement the PDCCH monitoring indication method.

In the eighth aspect, the present disclosure provides in some embodiments a computer-readable storage medium storing therein a computer program, wherein the computer program is executed by a processor so as to implement the PDCCH monitoring indication method.

BRIEF DESCRIPTION OF THE DRAWINGS

In order to more clearly describe the technical solutions of embodiments of the present disclosure or the related art, the drawings used in the description of the embodiments or the related art will be briefly introduced below. Obviously, the drawings in the following description are merely some embodiments. For a person skilled in the art, other drawings can be obtained based on these drawings without creative work.

DETAILED DESCRIPTION

Figure 1:
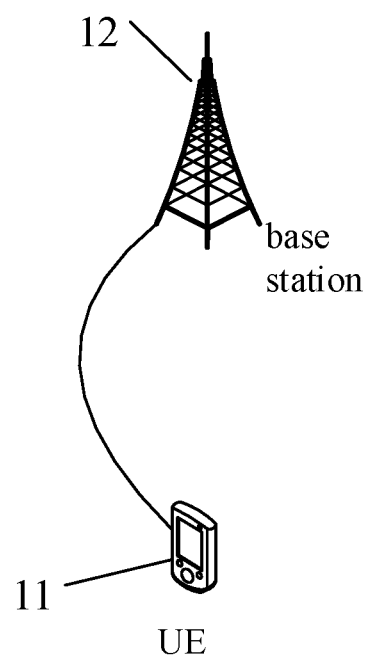
FIG. 1 is a block diagram showing a network system according to an embodiment of the present disclosure.

In the following, the technical solutions in the embodiments of the present disclosure will be clearly and completely described with reference to the drawings. Obviously, the described embodiments are part of embodiments of the present disclosure, but not all of them. Based on the embodiments of the present disclosure, all other embodiments obtained by a person skilled in the art without creative work shall fall within the protection scope of the present disclosure.

Such words as "first" and "second" involved in the specification and the appended claims are merely used to differentiate similar objects rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. Furthermore, the term "and/or" in the specification and the claims means that at least one of the connected objects, such as A and/or B, means that there are three conditions, A alone, B alone, and both A and B.

Such expressions as "illustrative" and "for example" are merely used to show examples or explanations. Any illustrative embodiment or scheme in the present disclosure shall not be construed as being superior over the other embodiment or scheme. Definitely, these words intend to exhibit relevant concepts in a concrete manner.

Embodiments of the present disclosure are described below with reference to the accompanying drawings. The control channel monitoring method, monitoring indication method, terminal, and network device provided in the embodiments of the present disclosure may be applied to a wireless communication system. The wireless communication system may be a system employing 5th Generation (5G) mobile communication technology (hereinafter all simply referred to as a 5G system), and it will be appreciated by those skilled in the art that the 5G NR system is only exemplary and is not used to limit the scope of the disclosure.

Referring to FIG. 1, FIG. 1 is a structural diagram of a network system according to an embodiment of the present disclosure. As shown in FIG. 1, the network system includes a UE 11 and a base station 12. The user terminal 11 may be a User Equipment (UE), for example, a terminal-side device such as a mobile phone, a Tablet Personal Computer, a Laptop Computer, a personal digital assistant (PDA), a Mobile Internet Device (MID), or a Wearable Device. It should be noted that a specific type of the UE 11 is not limited in the embodiment of the present disclosure. The base station 12 may be a base station of 5G or advanced versions (e.g., gNB, 5G NR NB), or a base station in another communication system, or may be referred to as a Node B. It should be noted that only a 5G base station is used as an example in the present disclosure, but the specific type of the base station 12 is not limited.

In the description of embodiments of the present disclosure, some concepts used in the following description are first explained.

In a Long Term Evolution (LTE) system, because a terminal does not know some information (such as a transmission resource) of a Physical Downlink Control Channel (PDCCH), the terminal detects a PDCCH transmitted by a base station in a blind decode manner to acquire Downlink Control Information (DCI). The terminal needs to perform blind detection on a control channel in each non-DRX downlink sub-frame. The times of the detection performed by the terminal on the PDCCH is related to the following parameters.

DCI format types supported by the terminal, each DCI format type has a different DCI size. Taking the LTE as an example, the terminal needs to blindly detect two DCI format types, for example, DCI format 1A and DCI format 2.

Aggregation Level (AL) of PDCCH to be blindly detected by the terminal, in the LTE system, possible ALs of PDCCH include {1, 2, 4, 8} Control Channel Elements (CCEs), the terminal selects to blindly detect all or part of ALs of in the set of the CCEs based on the configuration of the protocol or the network.

PDCCH search space for blind detection by the terminal, the search space in the LTE system is defined as a series of CCEs resource required for blind detection for each AL, including the CCE start position and the number of candidate resources.

The following describes in detail the PDCCH blind detection in the LTE system.

In the LTE, because the PDCCH is an indication sent by the base station, the terminal has not received other information other than some system information, so the terminal does not know the number and location of CCEs it occupies, and the DCI format to be transmitted. Therefore, PDCCH detection belongs to blind detection.

First, the terminal needs to determine which DCI format the PDCCH carries. For the DCI format, the terminal obtains a certain DCI according to its current desired state. For example, when the terminal is in an idle state, the desired information is paging system information (SI). When uplink data is ready for transmission, the desired information is a terminal grant. After initiating a random access, the desired information is a Random Access Channel (RACH) response. For different information, a corresponding Radio Network Temporary Identity (RNTI) is used to perform a Cyclic Redundancy Check (CRC) with the CCE information. If the CRC succeeds, the terminal knows that the information is required by itself, and further decodes the contents of the DCI based on the modulation and coding scheme.

Second, if the terminal traverses all CCEs, the calculation amount will be very large for the terminal. Therefore, the LTE system divides the available CCE into two search spaces, a common search space and a terminal-specific search space. The data transmitted in the common search space mainly includes messages such as system information, Random Access Response (RAR), and paging, and each user implements search on them. The position of the common search space is fixed, always in CCE0-CCE16, and there are only two types of ALs in the common search space, i.e. 4 and 8. Therefore, when the user searches for the common search space, the user searches for the common search space for 4 times from CCE0 based on AL of 4, and then searches for the common search space for 2 times based on AL of 8. In a terminal-specific search space, the search start point of each terminal is different, and the ALs of the search space are 1, 2, 4, 8, the terminal searches for six times based on AL of 1, searches for six times based on AL of 2, searches for two times based on AL of 4, and searches for two times based on AL of 8. The number of times the terminal performs blind detection may be calculated as follows: the search time in common search space is 6, and the search times in terminal-specific search space is 16. In the terminal-specific search space, the DCI format in which the terminal is located at the same time has only two payload sizes, and therefore two times of search is needed, that is, 32 times.

When the terminal performs blind detection in the PDCCH search space, the terminal only needs to attempt to decode the DCI that may occur, and does not need to match all DCI formats.

The blind detection performed by the terminal means that the terminal finds the start position of the CCE, intercepts estimated length of the DCI at the start position of the CCE, and performs decoding. If the CRC of the decoded information bit is the same as the CRC carried in the PDCCH, the information bit carried by the current PDCCH is considered to be the currently transmitted DCI. Here, various RNTI are implicitly included in the CRC.

Currently, the NR supports periodic PDCCH monitoring, that is, a PDCCH is monitored once every few slots or OFDM symbols, so that power consumption of a terminal for frequently detecting a PDCCH can be saved. However, it is difficult for the base station to select an appropriate PDCCH monitoring periodicity for each service of each terminal due to the randomness of the arrival of the service packet and the randomness of the error of the service packet. In fact, except the periodic PDCCH monitoring, the terminal needs some additional PDCCH monitoring.

In the embodiments of the present disclosure, an additional PDCCH is introduced on the basis of periodic PDCCH monitoring, so as to solve the problems of randomness of arrival of service packets and randomness of error of service packets.

Figure 2:
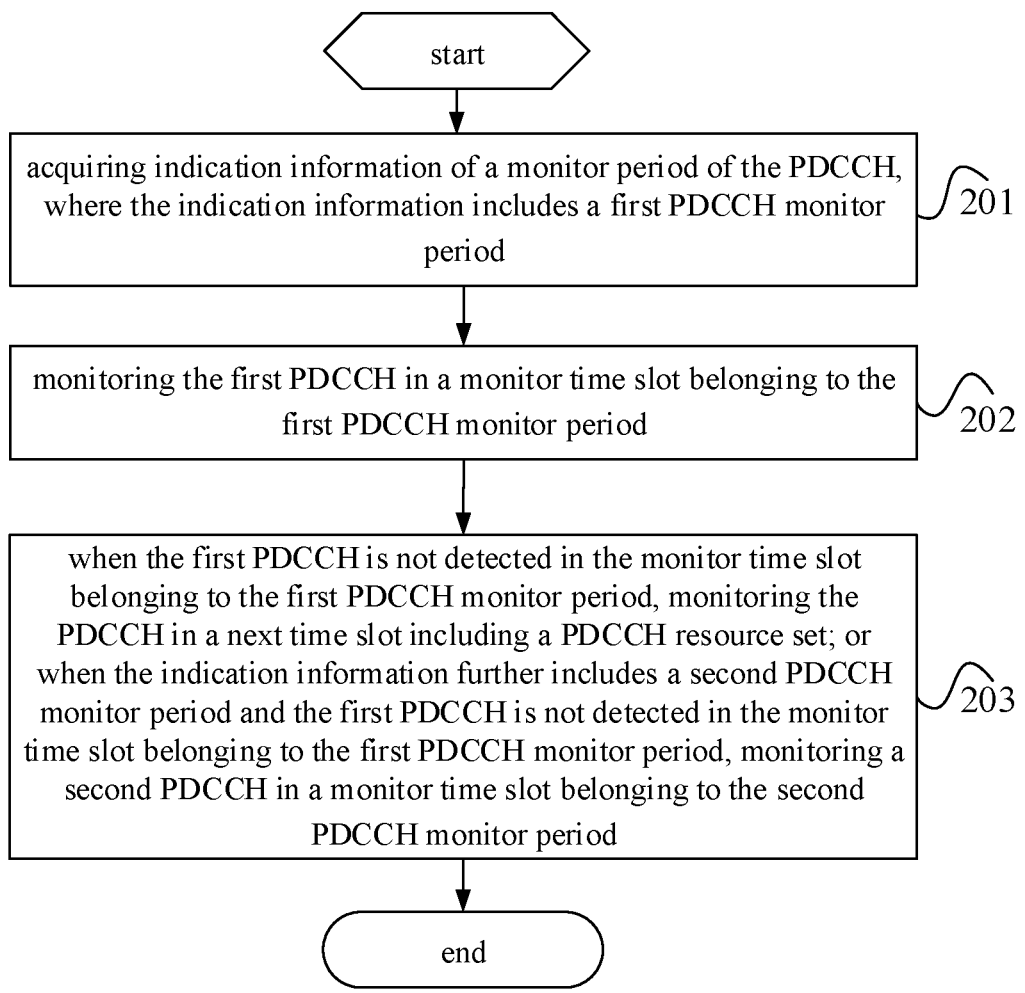
FIG. 2 is a flowchart of a PDCCH monitoring method according to an embodiment of the present disclosure.

Specifically, as shown in FIG. 2, which is a flowchart of a PCDDH monitoring method according to an embodiment of the present disclosure. The method includes the following steps.

Step 201: acquiring indication information for a PDCCH monitoring periodicity, where the indication information includes a first PDCCH monitoring periodicity.

It should be noted that the first PDCCH is referred to as a basic PDCCH (i.e., baseline PDCCH), that is, the terminal needs to monitor the PDCCH in specific slots. For example, the first PDCCH monitoring periodicity includes 10 slots, and the terminal needs to monitor the PDDCH in the first slot of every 10 slots, that is, the terminal monitors one slot every other 9 slots. In addition, the first PDCCH monitoring periodicity generally indicates a slot index to be monitored by the terminal (i.e., which slot or slots the terminal specifically needs to monitor in the monitoring periodicity). It should also be noted that the slot carrying the base PDCCH is referred to as a base slot (baseline slot), or the time-frequency domain resource on the slot carrying the base PDCCH is referred to as a base time-frequency domain resource; The slot index or time-frequency domain resource that the terminal needs to monitor is configurable, for example, different values are configured for different terminals and/or different services.

I should be noted that the slot in step 201 may also be a sub-frame.

Step 202: monitoring the first PDCCH in a monitoring slot belonging to the first PDCCH monitoring periodicity.

Step 203: when the first PDCCH is not detected in the monitoring slot belonging to the first PDCCH monitoring periodicity, monitoring the PDCCH in a next slot including a PDCCH resource set; or when the indication information further includes a second PDCCH monitoring periodicity and the first PDCCH is not detected in the monitoring slot belonging to the first PDCCH monitoring periodicity, monitoring a second PDCCH in a monitoring slot belonging to the second PDCCH monitoring periodicity.

It should be noted that the above mentioned step 203 includes two implementations.

In the first implementation, when the indication information includes the first PDCCH monitoring periodicity, if the terminal does not detect the first PDCCH in the monitoring slot of the first PDCCH monitoring periodicity, in order to avoid subsequent loss of the additional PDCCH, the terminal continues to monitor the PDCCH in the next slot including the resource set of the PDCCH.

It should be noted that the DCI in the first PDCCH is used to indicate at least one of a slot in which the third PDCCH (that is, the additional PDCCH mentioned above) to be monitored by the terminal and a time-frequency domain resource in which the third PDCCH is located.

In a second implementation, when the indication information includes both the first PDCCH monitoring periodicity and the second PDCCH monitoring periodicity, if the terminal does not detect the first PDCCH in the monitoring slot of the first PDCCH monitoring periodicity, in order to avoid subsequent loss of the additional PDCCH, the terminal monitors the second PDCCH in the monitoring slot belonging to the second PDCCH monitoring periodicity.

It should be noted that the DCI in the second PDCCH is used to indicate at least one of a slot in which the third PDCCH to be monitored by the terminal is located and a time-frequency domain resource in which the third PDCCH is located. The second PDCCH includes a PDCCH that does not belong to the first PDCCH monitoring periodicity (that is, the second PDCCH monitoring periodicity is different from the first PDCCH monitoring periodicity). Or the second PDCCH monitoring periodicity is the same as the first PDCCH monitoring periodicity.

Further, the DCI in the first PDCCH includes at least one bit for indicating whether the terminal needs to monitor the third PDCCH in a first slot, and if the third PDCCH is transmitted in the first slot (where the first slot is the closest slot after the first PDCCH of the resource set including the PDCCH), the DCI in the third PDCCH transmitted in the first slot includes at least one bit for indicating whether the terminal needs to monitor the third PDCCH in a second slot (where the second slot is the closest slot after the first slot of the resource set including the PDCCH, the first slot and the second slot may not belong to the first PDCCH monitoring periodicity). Alternatively, the DCI in the first PDCCH includes at least one bit indicating that the terminal does not monitoring the slot of the third PDCCH in slots between the first PDCCH and the next first PDCCH.

Figure 3:
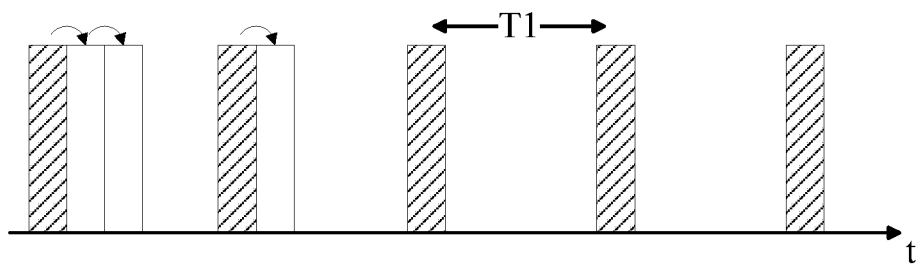
FIG. 3 is a schematic diagram showing a first setting mode of a monitoring slot of a first PDCCH according to an embodiment of the present disclosure.
Figure 4:
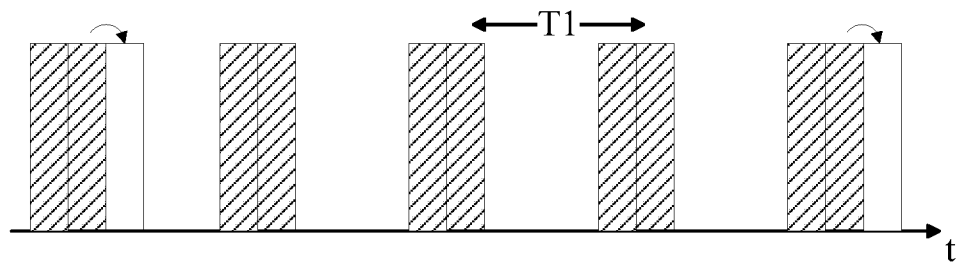
FIG. 4 is a schematic diagram showing a second setting mode of a monitoring slot of a first PDCCH according to an embodiment of the present disclosure.

For example, as shown in FIG. 3, the network device configures the terminal to monitor the first baseline PDCCH every T1 ms, and the network device indicates through the baseline PDCCH that the terminal needs to monitor an additional PDCCH in the first slot, and the first additional PDCCH indicates that the terminal needs to monitor the additional PDCCH in the second slot. As shown in FIG. 4, the network device configures the terminal to monitor the first two baseline PDCCHs every T1 ms, and the network device indicates through the second baseline PDCCH that the terminal needs to monitor the additional PDCCH in the first slot.

It should also be noted that because an additional PDCCH is introduced on the basis of periodic monitoring of PDCCH, in order to avoid loss of the additional PDCCH, a second PDCCH monitoring periodicity is introduced for a scenario in which additional PDCCH is lost. It should be noted that the second PDCCH monitoring periodicity is located within the first PDCCH monitoring periodicity, and the period length of the second PDCCH monitoring periodicity is generally less than or equal to the period length of the first PDCCH monitoring periodicity. When the period length of the second PDCCH monitoring periodicity is equal to the period length of the first PDCCH monitoring periodicity, it is equivalent that the second PDCCH monitoring periodicity is not configured, and a monitoring slot located in the second PDCCH monitoring periodicity and not belonging to the first PDCCH monitoring periodicity is used for a terminal to monitor the PDCCH when the first PDCCH is not detected.

Figure 5:
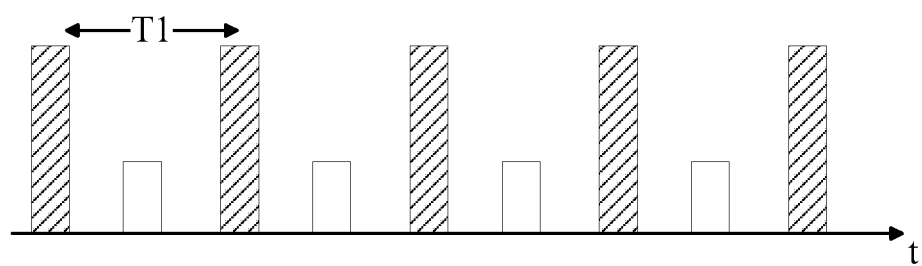
FIG. 5 is a schematic diagram showing a first setting mode of a monitoring slot of a first PDCCH and a monitoring slot of a second PDCCH according to an embodiment of the present disclosure.
Figure 6:
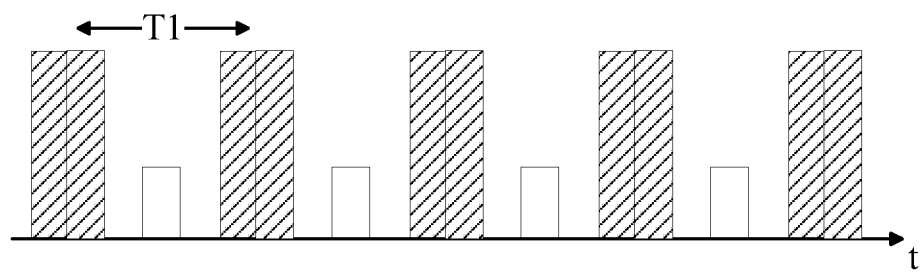
FIG. 6 is a schematic diagram showing a second setting mode of a monitoring slot of a first PDCCH and a monitoring slot of a second PDCCH.

For example, as shown in FIG. 5, the network device configures the terminal to monitor a first baseline PDCCH (represented by a slash-filled box) per T1 ms, and a PDCCH of a second PDCCH monitoring periodicity (represented by an unfilled box) is located between T1 ms. As shown in FIG. 6, the network device configures the terminal to monitor the first two baseline PDCCHs (indicated by a slash-filled box) every T1 ms, and the PDCCH of the second PDCCH monitoring periodicity (indicated by an unfilled box) is located between T1 ms.

It should be noted that after receiving the indication information for the monitoring periodicity, the terminal needs to monitor the PDCCH in a corresponding slot based on the configuration of the monitoring periodicity, and monitors the PDCCH in the next slot when the first PDCCH is not detected in the monitoring slot belonging to the first PDCCH monitoring periodicity. Or the second PDCCH is monitored in a monitoring slot belonging to the second PDCCH monitoring periodicity, so that loss of the PDCCH is avoided as much as possible, and power consumption of the terminal can be saved as much as possible.

It should be noted that the above-mentioned slot may refer to a mini-slot, that is, one mini-slot contains less than 14 OFDM symbols, and for example, one mini-slot contains two OFDM symbols. The above-mentioned slot is also possible to refer to a normal slot, i.e., one normal slot contains 14 OFDM symbols. A normal slot is also referred to as a slot in the protocol. The slot may also be a sub-frame.

Further, the bit number for the DCI in the second PDCCH is less than the bit number for the DCI in the first PDCCH. Or the physical resource block (PRB) allocation and Modulation and Coding Scheme (MCS) of the second PDCCH are the same as the PRB allocation and MCS of the first PDCCH used to indicate the third PDCCH.

Further, the first PDCCH monitoring periodicity and the second PDCCH monitoring periodicity may be defined by the protocol or acquired by the terminal from the network device.

Specifically, the acquiring of the first PDCCH monitoring periodicity includes: receiving a first PDCCH monitoring periodicity sent by a network device; or acquiring the first PDCCH monitoring periodicity defined by a network protocol.

Specifically, the acquiring of the second PDCCH monitoring periodicity includes: receiving the second PDCCH monitoring periodicity sent by the network device; or acquiring the second PDCCH monitoring periodicity defined by the network protocol.

It should be noted that when at least one of the first PDCCH monitoring periodicity and the second PDCCH monitoring periodicity is acquired based on the agreement of the network protocol, the network device does not need to perform corresponding monitoring periodicity interaction with the terminal, and when at least one of the first PDCCH monitoring periodicity and the second PDCCH monitoring periodicity is configured by the network device, the network device needs to send the corresponding monitoring periodicity to the terminal.

Further, when the indication information further includes a second PDCCH monitoring periodicity, the monitoring method further includes: when a first target PDCCH is not received in a slot indicated by the network device or defined by the network protocol, monitoring, by the terminal, the PDCCH in a first predefined monitoring slot belonging to a second PDCCH monitoring periodicity.

It should be noted that the first predefined monitoring slot is a monitoring slot that belongs to the second PDCCH monitoring periodicity and is after the terminal does not receive the first target PDCCH.

Alternatively, a monitoring slot in which a second PDCCH monitoring periodicity recently after a predetermined time is located is determined as a first predefined monitoring slot. The predetermined time is a time at which the network device determines that the terminal retransmits the DCI through the PDCCH after the terminal does not receive the first target PDCCH of the downlink grant or the uplink grant. The first target PDCCH is one of a first PDCCH, a second PDCCH, and a third PDCCH.

It should be noted that the predetermined time may be a predetermined time segment or a predetermined time interval, for example, a default time interval or a time interval having a dynamic value.

It should be further noted that the time in which the terminal retransmits DCI through the PDCCH after the terminal does not receive the first target PDCCH of downlink grant refers to an overall time in which the network device sends a downlink grant PDCCH, a terminal feeds back a response message (that is, an acknowledgement (ACK)/non-acknowledgement (NACK) for a PDSCH scheduled by the PDCCH), and the network device does not receive the response message until the network device sends the PDCCH in a monitoring slot in which the network device recently monitors the second PDCCH. The time in which the terminal retransmits DCI through the PDCCH after the terminal does not receive the first target PDCCH of the uplink grant refers to an overall time in which the network device transmits the uplink grant PDCCH, the terminal transmits a physical uplink shared channel (PUSCH) based on the uplink grant PDCCH, and the network device does not receive the PUSCH until the network device transmits the PDCCH in a monitoring slot which is the first slot belonging to the second PDCCH monitoring periodicity.

It should be noted that the above-mentioned sending PDCCH (or receiving PDCCH) refers to sending DCI (or receiving DCI) through the PDCCH, and the sending PUSCH (or receiving PUSCH) refers to sending data information (or receiving data information) through the PUSCH.

It should be further noted that all PDCCHs transmitted by the network device indicate the terminal to skip monitoring PDCCHs after the first PDCCH; or all PDCCHs transmitted by the network device cannot indicate the terminal to skip monitoring PDCCHs after the first PDCCH.

Specifically, when the second target PDCCH indicates the terminal to skip monitoring the PDCCH after the first PDCCH, after the terminal receives the second target PDCCH, the terminal monitors the PDCCH after the first PDCCH is skipped.

The second target PDCCH includes at least one of a first PDCCH, a second PDCCH, and a third PDCCH.

Specifically, when the third target PDCCH cannot indicate the terminal to skip monitoring the PDCCH after the first PDCCH, if the third target PDCCH received by the terminal indicates to skip monitoring the PDCCH after the first PDCCH, the terminal continues to monitor the next first PDCCH.

The third target PDCCH is at least one of a first PDCCH, a second PDCCH, and a third PDCCH.

It should be noted that after monitoring the PDCCH, the terminal feeds back corresponding information to the network device based on whether the PDCCH is monitored or not. Specifically, after the network device transmits DCI on the PDCCH in the first PDCCH monitoring periodicity and the second PDCCH monitoring periodicity, if no response message sent by the terminal for the transmitted DCI or the PUSCH is received at the corresponding position, the DCI is transmitted to the terminal in a monitoring slot which is the first slot belonging to the second PDCCH monitoring periodicity. It should be noted that the DCI retransmitted by the network device may be considered as a new DCI.

Figure 7:
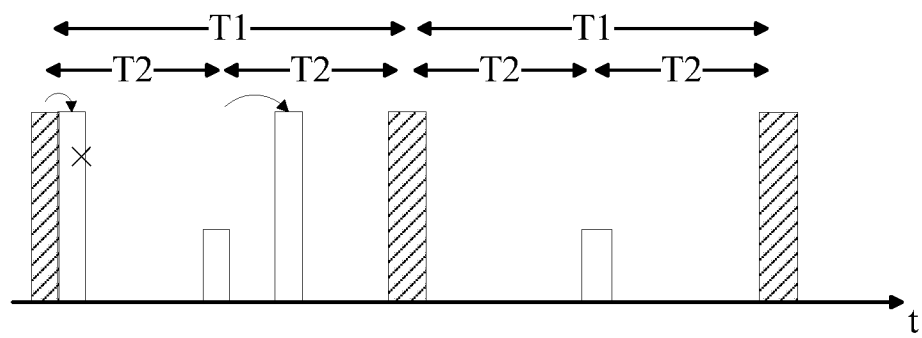
FIG. 7 is a schematic diagram showing a first indication mode in which a network device transmits a new DCI according to an embodiment of the present disclosure.

For example, as shown in FIG. 7, a network device configures a terminal to monitor the baseline PDCCH every T1 ms, and the network device indicates, through baseline PDCCH, that the terminal needs to monitor additional PDCCH on the next slot, and a first additional PDCCH indicates that the terminal needs to monitor additional PDCCH on the next slot (indicated by a high box without padding). A PDCCH of a second PDCCH monitoring periodicity (indicated by a low box without padding) is located between T1 ms. If the network device does not receive a response message of DCI or PUSCH sent by the terminal for additional PDCCH at a corresponding position, a new DCI is sent to the terminal through the PDCCH on the monitoring slot which is the first slot belonging to the second PDCCH monitoring periodicity, to indicate the terminal to monitor the new additional PDCCH.

Figure 8:
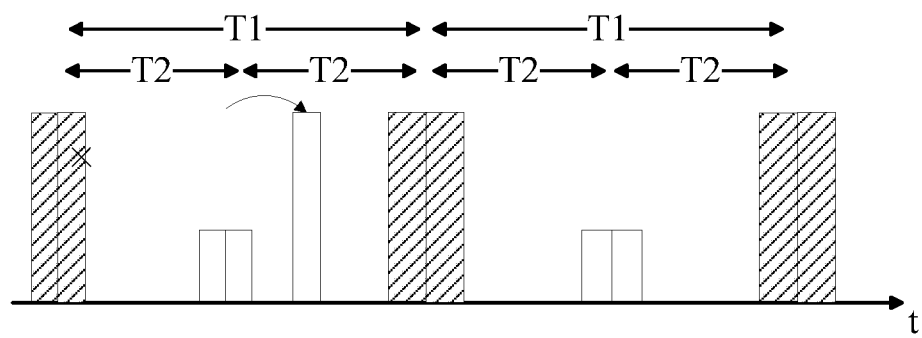
FIG. 8 is a schematic diagram showing a second indication mode in which a network device transmits a new DCI according to an embodiment of the present disclosure.

For example, as shown in FIG. 8, the network device configures the terminal to monitor the first two baseline PDCCHs every T1 ms, and the network device configures the terminal to monitor the first two slots every T2 ms, and the PDCCH of the second PDCCH monitoring periodicity is located between T1 ms. If the network device does not receive the response message of the DCI or the PUSCH sent by the terminal for the second baseline PDCCH at the corresponding position, the network device transmits the new DCI to the terminal through the PDCCH on the second monitoring slot which is the first slot belonging to the second PDCCH monitoring periodicity, to indicate the terminal to monitor the new additional PDCCH.

Specifically, after the network device transmits DCI on the PDCCH in the first PDCCH monitoring periodicity and the second PDCCH monitoring periodicity, if no response message send by the terminal for the transmitted DCI or PUSCH is received at the corresponding location, the network device sends the DCI to the terminal in the slot of the closest first PDCCH. It should be noted that the DCI retransmitted by the network device may be considered as the new DCI.

That is, when the network device finds that the terminal has not received the DCI transmitted through the PDCCH in time, the network device retransmits the DCI to the terminal to ensure that the DCI information can be correctly received by the terminal. It should be noted that in this implementation, it indicates that the second PDCCH monitoring periodicity is the same as the first PDCCH monitoring periodicity.

Figure 9:
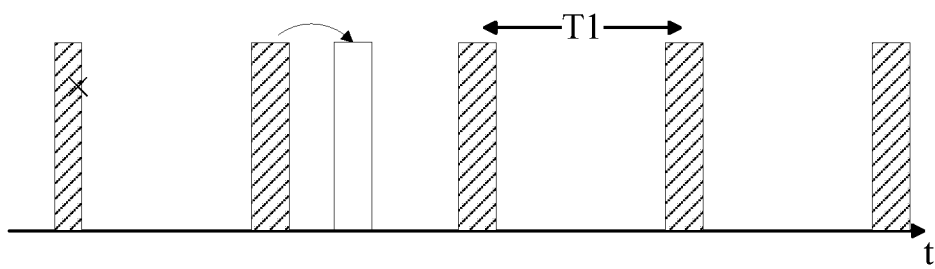
FIG. 9 is a schematic diagram showing a third indication mode in which a network device transmits a new DCI according to an embodiment of the present disclosure.
Figure 10:
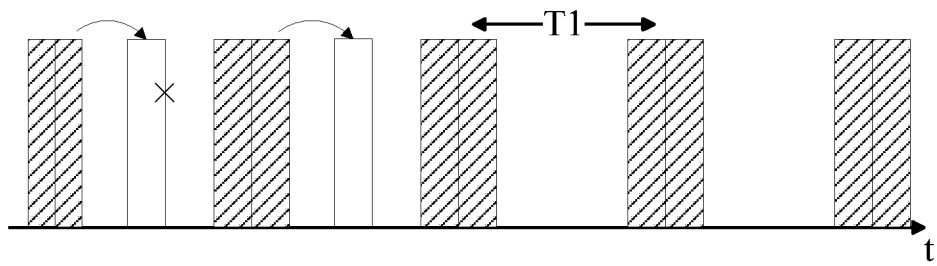
FIG. 10 is a schematic diagram showing a fourth indication mode in which a network device transmits a new DCI according to an embodiment of the present disclosure.

For example, as shown in FIG. 9, the network device configures the terminal to monitor the first baseline PDCCH every T1 ms. If the network device does not receive a response message from the terminal to the first baseline PDCCH or the PUSCH at the corresponding location, the network device sends a new DCI to the terminal through the PDCCH in the slot in which the nearest first PDCCH is located, indicate the terminal to monitor the new additional PDCCH. As shown in FIG. 10, a network device configures a terminal to monitor the first two baseline PDCCHs every T1 ms, and the network device indicates, through the second baseline PDCCH, that the terminal needs to monitor the additional PDCCH in the next slot. If the network device does not receive a response message from the terminal to the additional PDCCH or the PUSCH at a corresponding location, a new DCI is sent to the terminal through the second baseline PDCCH in the slot in which the closest first PDCCH is located, to indicate the terminal to monitor a new additional PDCCH.

Further, in this embodiment of the present disclosure, the DCI in the fourth target PDCCH is Group Common DCI and/or UE-specific DCI.

The fourth target PDCCH is at least one of a first PDCCH, a second PDCCH, and a third PDCCH.

Optionally, the network device may further determine whether to subsequently transmit the DCI based on the network status. Specifically, if there is no data scheduling in the slot in which the first PDCCH is located or in the slot in which the second PDCCH is located, the network device performs one of the following processes.

B1. not sending DCI.

That is, the network device does not send DCI when there is no data scheduling.

In this case, the terminal does not receive the PDCCH, and the terminal monitors the second PDCCH in the slot belonging to the second PDCCH period.

B2. sending DCI, the DCI indicating the terminal not to monitor the PDCCH in a continuous predefined number of slots.

In this case, the network device also needs to transmit DCI to indicate the terminal not to monitor the PDCCH any more in the next N slots (N is indicated by DCI, N is greater than or equal to 1), and indicate the terminal to monitor the slot of the PDCCH again in the (N+1) th slot. In this case, the network device may also indicate the unknown number of slots through DCI, and the terminal will monitoring the second PDCCH in the slots belonging to the second PDCCH period.

It should be noted that, when the terminal monitoring PDCCH in monitoring slot belong to the first PDCCH monitoring periodicity, the terminal performs the monitoring operation under the condition that the period length of the first PDCCH monitoring periodicity is fixed. To further ensure that the terminal does not lose the PDCCH, the period of the first PDCCH monitoring periodicity may not be fixed. Optionally, a specific implementation in which the terminal monitors the first PDCCH in the monitoring slot belonging to the first PDCCH monitoring periodicity includes at least one of the following processes.

A1. monitoring the PDCCH based on a first predefined period length of the first PDCCH monitoring periodicity, and after the PDCCH is detected, monitoring the PDCCH based on a second predefined period length of the first PDCCH monitoring periodicity.

It should be noted that the length of the first predefined period is greater than the length of the second predefined period. It is described in the foregoing implementation that after the terminal monitors the PDCCH in the monitoring slot in which the first PDCCH monitoring periodicity is located, it may indicate that frequently transmission of the PDCCH will be implemented thereafter. In this case, in order to avoid loss of the PDCCH, it is necessary to shorten the period length of the first PDCCH monitoring periodicity, for example, the period is shorten to be only one slot, so as to improve the monitoring frequency of the PDCCH.

A2. when receiving a monitoring periodicity length change indication, replacing a first predefined period length of a first PDCCH monitoring periodicity by a third predefined period length to monitor the PDCCH.

It should be noted that the third predefined period length may be less than the first predefined period length, or may be greater than or equal to the second predefined period length. The monitoring periodicity length change indication is indicated by DCI, Medium Access Control Control Element (MAC CE), or Radio Resource Control (RRC) signaling.

A3. when a counter reaches a predefined threshold, replacing a first predefined period length of a first PDCCH monitoring periodicity by a fourth predefined period length to monitor the PDCCH.

The fourth predefined period length is greater than the first predefined period length. The counter counts the number of slots in which no PDCCH is detected, and if the PDCCH is detected in one slot, the counter is reset to zero. The predefined threshold is predefined by a network protocol or a slot number threshold configured by a network device, for example, the slot number threshold is set to P, and P is an integer greater than 0.

In the A3 mode, when the terminal does not monitoring the PDCCH in a plurality of slots, it indicates that there is no data transmission. At this time, the period length of the first PDCCH monitoring periodicity is appropriately increased to reduce power consumption of the terminal.

It should be further noted that the period length of the first PDCCH monitoring periodicity (that is, the first predefined period length, the second predefined period length, the third predefined period length, and the fourth predefined period length) belongs to the set $\{T1_0, T1_1, \ldots, T1_{K-1}\}$.

Where $T1_{i+1}=A \times T1_i$, $T1_{i+1}$ is a value of the (i+1)th period length, T1i is a value of the (i) th period length, i=0, 1, 2 . . . , K−2, K is the total sum of period lengths in the set, and A is a positive integer greater than or equal to 2.

In summary, the embodiment of the present disclosure introduces the baseline PDCCH that belongs to the first PDCCH monitoring periodicity, and then introduces the additional PDCCH, so as to avoid the problems that it is difficult for the base station to select an appropriate PDCCH monitoring periodicity for each service of each terminal due to the randomness of the arrival of the service packet and the randomness of the error of the service packet, and as a result, the terminal is unable to receive and realize monitoring of all PDCCHs, and information loss is easily caused. In this way, information loss is avoided as much as possible, and reliability of network communication is ensured. In addition, by introducing the second PDCCH monitoring periodicity, when the first PDCCH is not detected in the monitoring slot belonging to the first PDCCH monitoring periodicity, the PDCCH is monitored in the monitoring slot belonging to the second PDCCH monitoring periodicity, thereby avoiding power consumption of the terminal which monitors the PDCCH in each subsequent slot because the PDCCH is not received, and also avoiding a delay increase problem caused by the terminal which monitors the PDCCH in the slot in which the subsequent first PDCCH monitoring periodicity is located because the terminal does not receive the PDCCH.

Specifically, the slot described in the above disclosed embodiment may also be a sub-frame.

Figure 11:
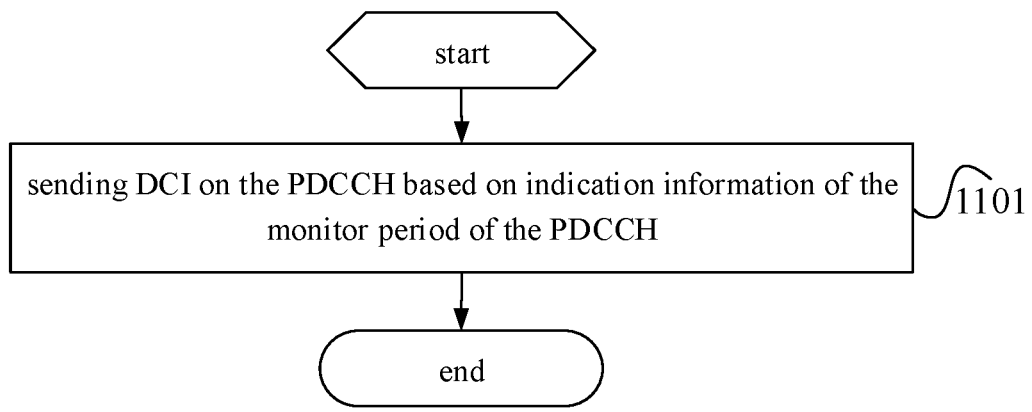
FIG. 11 is a flowchart of a PDCCH monitoring indication method according to an embodiment of the present disclosure.

As shown in FIG. 11, an embodiment of the present disclosure provides a method of monitoring and indicating a physical downlink control channel, including the following steps.

Step 1101: sending DCI on the PDCCH based on indication information for the PDCCH monitoring periodicity.

The indication information includes a first PDCCH monitoring periodicity; or the indication information includes a first PDCCH monitoring periodicity and a second PDCCH monitoring periodicity.

When the indication information further includes a second PDCCH monitoring periodicity, the second PDCCH monitoring periodicity is used to enable the terminal to monitor the second PDCCH in a monitoring slot belonging to the second PDCCH monitoring periodicity when the terminal does not detect the first PDCCH in the monitoring slot belonging to the first PDCCH monitoring periodicity.

Further, after the sending DCI on the PDCCH based on the indication information for the PDCCH monitoring periodicity, the method further includes: if no response message of DCI transmitted by the terminal or PUSCH is received at the corresponding position, the DCI is transmitted to the terminal in a monitoring slot which is the first slot belonging to the second PDCCH monitoring periodicity.

Further, after the sending DCI on the PDCCH based on the indication information for the PDCCH monitoring periodicity, the method further includes: if there is no data scheduling in the slot in which the first PDCCH is located or in the slot in which the second PDCCH is located, performing one of the following processes: not sending DCI; and sending DCI, wherein the DCI indicates the terminal not to monitor the PDCCH on a continuous predefined number of slots.

It should be noted that all the description on the network device side in the above embodiment is applicable to the embodiment of the physical downlink control channel monitoring indication method applied to the network device side, and the same technical effect can be achieved.

Figure 12:
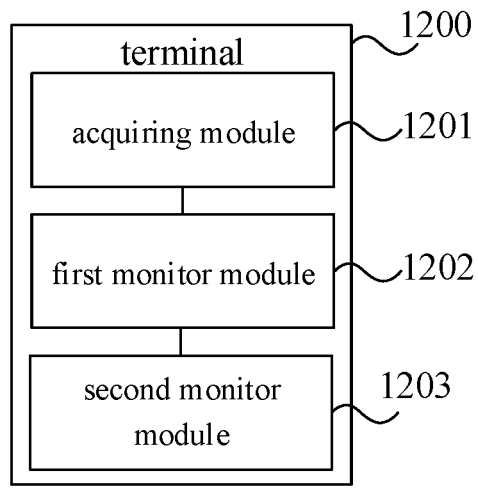
FIG. 12 is a block diagram of a terminal according to an embodiment of the present disclosure.

As shown in FIG. 12, an embodiment of the present disclosure further provides a terminal 1200, including: an acquiring module 1201, configured to acquire indication information for a monitoring periodicity of a PDCCH, where the indication information includes a first PDCCH monitoring periodicity; a first monitoring module 1202, configured to monitor a first PDCCH in a monitoring slot belonging to the first PDCCH monitoring periodicity; and a second monitoring module 1203, configured to, when the first PDCCH is not detected in the monitoring slot belonging to the first PDCCH monitoring periodicity, monitoring the PDCCH in a next slot including a PDCCH resource set; or when the indication information further includes a second PDCCH monitoring periodicity and the first PDCCH is not detected in the monitoring slot belonging to the first PDCCH monitoring periodicity, monitoring a second PDCCH in a monitoring slot belonging to the second PDCCH monitoring periodicity.

Further, the acquiring the first PDCCH monitoring periodicity includes: receiving the first PDCCH monitoring periodicity sent by a network device; or acquiring the first PDCCH monitoring periodicity defined by a network protocol.

Further, the acquiring the second PDCCH monitoring periodicity includes: receiving the second PDCCH monitoring periodicity sent by the network device; or acquiring the second PDCCH monitoring periodicity defined by the network protocol.

Specifically, the DCI in the first PDCCH is used to indicate at least one of a slot in which the third PDCCH to be monitored by the terminal is located and a time-frequency domain resource in which the third PDCCH is located.

When the indication information further includes a second PDCCH monitoring periodicity, the DCI in the second PDCCH is used to indicate at least one of a slot in which the third PDCCH to be monitored by the terminal is located and a time-frequency domain resource in which the third PDCCH is located.

The second PDCCH monitoring periodicity is the same as or different from the first PDCCH monitoring periodicity.

Specifically, the bit number for the DCI in the second PDCCH is less than the bit number for the DCI in the first PDCCH; or the physical resource block allocation and modulation coding scheme of the second PDCCH is the same as the physical resource block allocation and modulation coding scheme of the first PDCCH used for indicating the third PDCCH.

Specifically, the DCI in the first PDCCH includes at least one bit for indicating whether the terminal needs to monitor the third PDCCH in the first slot, and if the third PDCCH is transmitted in the first slot, the DCI in the third PDCCH transmitted in the first slot includes at least one bit for indicating whether the terminal needs to monitor the third PDCCH in the second slot.

Alternatively, the DCI in the first PDCCH includes at least one bit for indicating that the terminal does not monitoring the slot of the third PDCCH in the slot between the first PDCCH and the next first PDCCH.

Specifically, when the indication information further includes a second PDCCH monitoring periodicity, the terminal further includes: a third monitoring module, configured to, when the first target PDCCH is not received in the slot indicated by the network device or defined by the network protocol, monitoring the PDCCH in a first predefined monitoring slot belonging to a second PDCCH monitoring periodicity.

The first predefined monitoring slot is a monitoring slot that belongs to the second PDCCH monitoring periodicity after the terminal does not receive the first target PDCCH; or a monitoring slot in which a closest second PDCCH monitoring periodicity after a predetermined time is located is determined as a first predefined monitoring slot. The predetermined time is a time at which the network device retransmits the DCI through the PDCCH after the network device determines that the terminal does not receive the first target PDCCH of the downlink grant or the uplink grant.

The first target PDCCH is one of a first PDCCH, a second PDCCH, and a third PDCCH.

Further, when the second target PDCCH indicates the terminal to skip monitoring the first PDCCH and to monitor the following PDCCH after the first PDCCH to monitor, after the terminal receives the second target PDCCH, the terminal monitors the PDCCH following the skipped first PDCCH.

The second target PDCCH includes one of a first PDCCH, a second PDCCH, and a third PDCCH.

Further, when the third target PDCCH cannot indicate the terminal to skip monitoring the first PDCCH and to monitor the following PDCCH after the first PDCCH to monitor, if the third target PDCCH received by the terminal indicates to skip monitoring the first PDCCH and to monitor the following PDCCH after the first PDCCH to monitor, the terminal continues to monitor the next first PDCCH.

The third target PDCCH is at least one of a first PDCCH, a second PDCCH, and a third PDCCH.

Specifically, the DCI in the fourth target PDCCH is group common DCI and/or UE specific DCI.

The slot is a micro slot or a normal slot.

The fourth target PDCCH is at least one of a first PDCCH, a second PDCCH, and a third PDCCH.

Further, the first monitoring module 1202 is configured to: monitoring the PDCCH based on a first predefined period length of the first PDCCH monitoring periodicity, and after the PDCCH is detected, monitoring the PDCCH based on a second predefined period length of the first PDCCH monitoring periodicity; when receiving a monitoring periodicity length change indication, replace the first predefined period length of a first PDCCH monitoring periodicity by a third predefined period length to monitor the PDCCH; and when a counter reaches a predefined threshold, replace the first predefined period length of a first PDCCH monitoring periodicity by a fourth predefined period length to monitor the PDCCH.

The first predefined period length is greater than the second predefined period length, and the fourth predefined period length is greater than the first predefined period length. The counter counts the number of slots in which no PDCCH is detected, and if the PDCCH is detected in one slot, the counter is reset to zero. The predefined threshold is predefined by a network protocol or a slot number threshold configured by a network device.

Specifically, when a monitoring periodicity length change indication is received, and the first predefined period length of the first PDCCH monitoring periodicity is replaced by the third predefined period length to monitor the PDCCH, the monitoring periodicity length change indication is indicated by DCI, MAC CE, or a RRC signaling.

Specifically, the value of the period length of the first PDCCH monitoring periodicity belongs to the set $\{T1_0, T1_1, \ldots, T1_{K-1}\}$.

Where $T1_{i+1}=A \times T1_i$, $T1_{i+1}$ is a value of the (i+1)th period length, T1i is a value of the (i) th period length, i=0, 1, 2 . . . , K−2, K is the total sum of period lengths in the set, and A is a positive integer greater than or equal to 2.

The terminal 1200 provided in the embodiment of the present disclosure is capable of implementing various processes implemented by the terminal 1200 in the method embodiment of FIG. 2. To avoid repetition, details are not described herein. According to an embodiment of the present disclosure, when a first PDCCH is not detected in a monitoring slot belonging to the first PDCCH monitoring periodicity, the terminal 1200 monitors the PDCCH in a next slot, or monitors the second PDCCH in a monitoring slot belonging to the second PDCCH monitoring periodicity, thereby avoiding power consumption caused by monitoring the PDCCH in each slot of the terminal and reducing PDCCH monitoring delay.

Specifically, the slot described in the above embodiment may also be a sub-frame.

Figure 13:
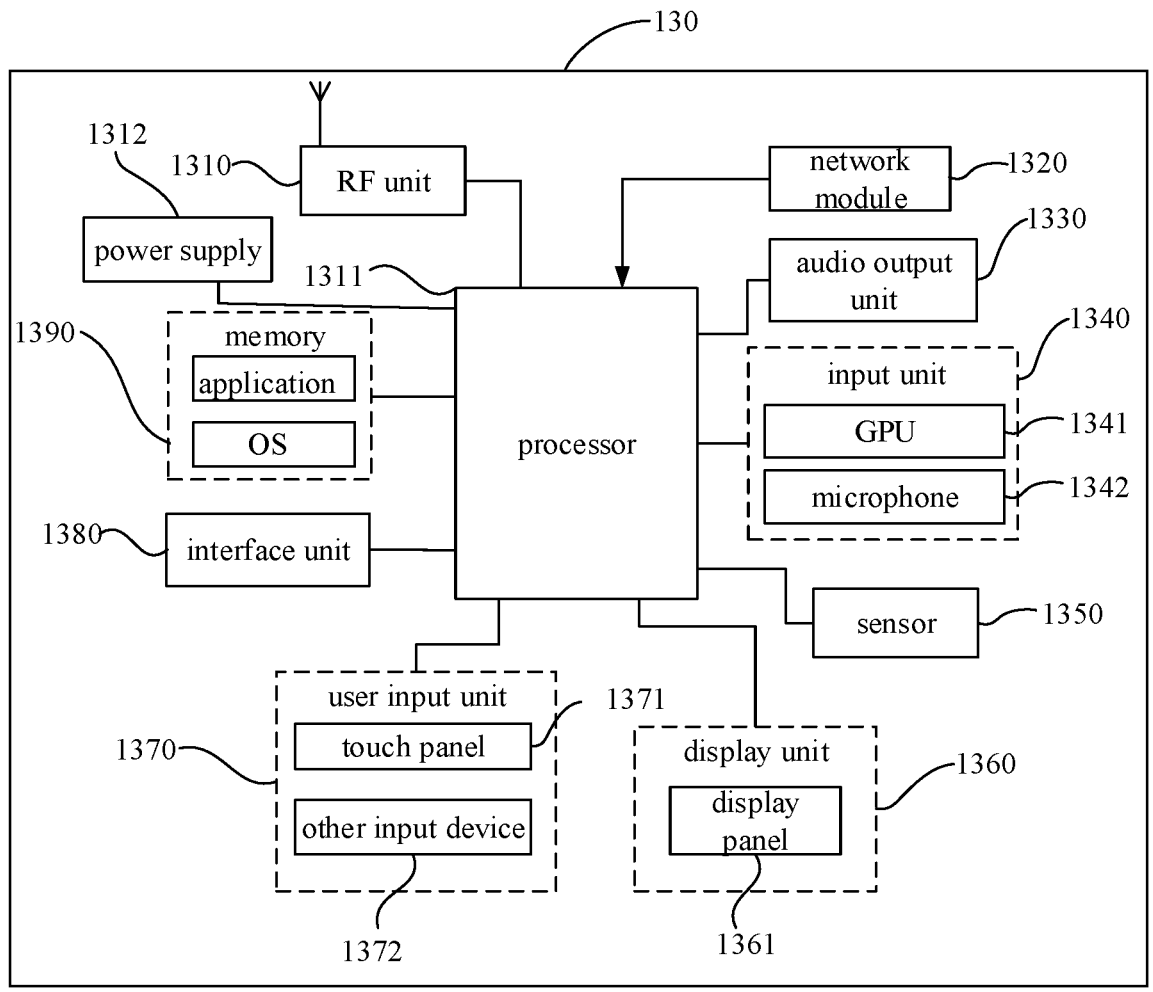
FIG. 13 is a structural block diagram of a terminal according to an embodiment of the present disclosure.

FIG. 13 is a schematic diagram of a hardware structure of a terminal according to an embodiment of the present disclosure.

The terminal 130 includes, but is not limited to, a radio frequency (RF) unit 1310, a network module 1320, an audio output unit 1330, an input unit 1340, a sensor 1350, a display unit 1360, a user input unit 1370, an interface unit 1380, a memory 1390, a processor 1311, and a power supply 1312. It will be appreciated by a person skilled in the art that the terminal structure shown in FIG. 13 does not constitute a limitation on the terminal, which may include more or fewer components, or some components may be combined, or arranged differently. In the embodiment, the terminal includes, but is not limited to, a mobile phone, a tablet computer, a notebook computer, Personal Digital Assistant (PDA), vehicle-mounted terminal, wearable device or pedometer.

The processor 1311 is configured to acquire indication information for a monitoring periodicity of a PDCCH, the indication information includes a first PDCCH monitoring periodicity; monitoring a first PDCCH in a monitoring slot belonging to the first PDCCH monitoring periodicity; when the first PDCCH is not detected in the monitoring slot belonging to the first PDCCH monitoring periodicity, monitoring the PDCCH in a next slot including a PDCCH resource set; or when the indication information further includes a second PDCCH monitoring periodicity and the first PDCCH is not detected in the monitoring slot belonging to the first PDCCH monitoring periodicity, monitoring a second PDCCH in a monitoring slot belonging to the second PDCCH monitoring periodicity.

According to the terminal of the embodiment of the present disclosure, when a first PDCCH is not detected in a monitoring slot belonging to the first PDCCH monitoring periodicity, a PDCCH in a next slot is monitored or a second PDCCH is monitored in a monitoring slot belonging to the second PDCCH monitoring periodicity, thereby avoiding power consumption caused by monitoring the PDCCH in each slot of the terminal, and reducing PDCCH monitoring delay.

It should be understood that in this embodiment of the present disclosure, the RF unit 1310 is configured to transmit and receive signals during the information transmission or phone call. To be specific, the RF unit 1310 may, upon the receipt of downlink data from a network device, transmit the downlink data to the processor 1311 for subsequent treatment. In addition, the RF unit 1310 may transmit uplink data to the network device. Usually, the RF unit 1310 may include, but not limited to, an antenna, at least one amplifier, a transceiver, a coupler, a low-noise amplifier and a duplexer. In addition, the RF unit 1310 may communicate with the other devices via a wireless communication system and a network.

The network module 1320 is configured to enable the terminal to access the broadband Internet in a wireless manner, e.g., help a user to receive and send an e-mail, browse a web page or access a streaming media.

The audio output unit 1330 is configured to convert audio data received by the RF unit 1310 or the network module 1320, or audio data stored in the memory 1390, into an audio signal and output the audio signal as a sound. In addition, the audio output unit 1330 is further configured to provide an audio output related to a specific function executed by the terminal 130 (e.g., a sound occurring when a calling signal or a message has been received). The audio output unit 1330 may include a loudspeaker, a buzzer and a receiver.

The input unit 1340 is configured to receive an audio or video signal. It may include a Graphics Processing Unit (GPU) 1341 and a microphone 1342. The GPU 1341 is configured to process image data of a static image or video acquired by an image collection unit (e.g., a camera) in a video capturing mode or an image capturing mode, and a processed image frame may be displayed by the display unit 1360. The image frame processed by the GPU 1341 may be stored in the memory 1390 (or any other storage medium) or transmitted via the RF unit 1310 or network module 1320. The microphone 1342 is configured to receive a sound, and convert the sound into voice data. In a call mode, the processed audio data may be converted into data in a format capable of being transmitted by the RF unit 1310 to a mobile communication base station.

The at least one sensor 1350 may include a light sensor, a movement sensor and the other sensors. To be specific, the light sensor may include an ambient light sensor or a proximity sensor. The ambient light sensor is configured to adjust a brightness value of a display panel 1361 in accordance with ambient light. The proximity sensor is configured to turn off the display panel 1361 and/or a backlight source when the terminal 130 moves close to an ear. As one of the movement sensors, an accelerometer may detect acceleration in various directions (usually a three-axis accelerometer), and detect a level and a direction of a gravity force in a static state. Through the accelerometer, it is able to identify a posture of the UE (e.g., perform a switching operation between portrait and landscape orientations, play relevant games, and calibrate a posture of a magnetometer), and perform vibration-related functions (e.g., count steps and strikes). The sensor 165 may further include a fingerprint sensor, a pressure sensor, an iris sensor, a molecule sensor, a gyroscope, a barometer, a hygrometer, a thermometer or an infrared sensor, which will not be particularly defined herein.

The display unit 1360 is configured to display information inputted by the user or provided to the user. The display unit 166 may include the display panel 1361, e.g., a Liquid Crystal Display (LCD) panel, or an Organic Light-Emitting Diode (OLED) panel.

The user input unit 1370 is configured to receive digital or character information inputted by the user, and generate a key signal input related to user settings and function control of the UE. To be specific, the user input unit 1370 may include a touch panel 1371 and other input device 1372. The touch panel 1371, also called as touch screen, is configured to collect a touch operation made by the user on or in proximity to the touch panel (e.g., an operation made by the user through any appropriate object or attachment (e.g., finger or stylus) on or in the proximity to the touch panel 1371). The touch panel 1371 may include a touch detection unit and a touch controller. The touch detection unit is configured to detect a touch position and a signal generated due to the touch operation, and transmit the signal to the touch controller. The touch controller is configured to receive touch information from the touch detection unit, convert it into coordinates of a touch point, transmit the coordinates to the processor 1311, and receive and execute a command from the processor 1311. In addition, the touch panel 1371 may be of a resistive type, a capacitive type, an infrared type or a surface acoustic wave (SAW) type. The other input device 1372 may include, but not limited to, a physical keyboard, a functional button (e.g., a volume control button or an on/off button), a trackball, a mouse, and a joystick, which will not be particularly defined herein.

Further, the touch panel 1371 may cover the display panel 1361. When the touch operation made on or in proximity to the touch panel 1371 has been detected, the touch panel 1371 may transmit the touch information to the processor 1311, so as to determine a type of a touch event. Then, the processor 1311 may control the display panel 1361 to provide a corresponding visual output in accordance with the type of the touch event. Although the touch panel 1371 and the display panel 1361 are configured as two separate members in FIG. 13, in some embodiments of the present disclosure, they may be integrated so as to achieve the input and output functions of the electronic device, which will not be particularly defined herein.

The interface unit 1380 is configured to provide an interface between an external device and the terminal 130. For example, the external device may include a wired or wireless headset port, an external power source port (or a charging port), a wired or wireless data port, a memory card port, a port for a device having an identification module, an audio input/output (I/O) port, a video I/O port, and an earphone port. The interface unit 1380 is configured to receive an input from the external device (e.g., data information and electricity) and transmit the input to one or more elements of the terminal 130, or transmit data between the terminal 130 and the external device.

The memory 1390 is configured to store therein a software application and various data. It may mainly include an application storage area and a data storage area. An operating system and at least one application for the functions (e.g., an audio/image playing function) may be stored in the application storage area. Data created in accordance with the operation of the mobile phone (e.g., audio data and textbook) may be stored in the data storage area. In addition, the memory 1390 may include a high-speed random access memory (RAM), or a non-volatile memory (e.g., at least one magnetic disk or flash memory), or any other volatile solid state memory.

As a control center of the electronic device, the processor 1311 may be connected to the other members of the electronic device via various interfaces and circuits, and configured to run or execute the software program and/or module stored in the memory 1390, and call the data stored in the memory 1390, so as to execute the functions of the electronic device and process the data, thereby to monitor the entire electronic device. The processor 1311 may include one or more processing units. In a possible embodiment of the present disclosure, an application processor and a modem may be integrated into the processor 1311. The application processor is mainly configured to process the operating system, a user interface and the application. The modem is mainly configured to process wireless communication. It should be appreciated that, the modem may also not be integrated into the processor 1311.

The power source 1312 (e.g., a battery) is configured to supply power to the members of the terminal 130. In a possible embodiment of the present disclosure, the power source 1312 is logically connected to the processor 1311 via a power source management system, so as to achieve such functions as charging, discharging and power consumption management through the power source management system.

In addition, the terminal 130 may include some functional modules not shown in FIG. 13, which will not be particularly defined herein.

Optionally, an embodiment of the present disclosure further provides a terminal including a processor 1311, a memory 1390, and a computer program stored in the memory 1390 and executed by the processor 1311. The computer program, when executed by the processor 1311, implements various processes of the physical downlink control channel monitoring method and achieves the same technical effect. To avoid repetition, details are not described herein.

Some embodiments of the present disclosure further provide a computer-readable storage medium having stored thereon a computer program. When executed by a processor, the computer program implements each process of the physical downlink control channel monitoring method, and can achieve the same technical effect. To avoid repetition, details are not described herein. The computer readable storage medium includes a Read-Only Memory (ROM), a Random Access Memory (RAM), a magnetic disk, an optical disk, and the like.

Figure 14:
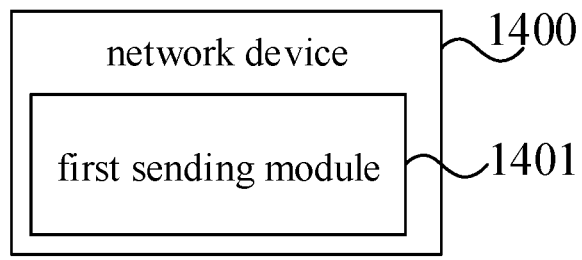
FIG. 14 is a block diagram of a network device according to an embodiment of the present disclosure.

As shown in FIG. 14, an embodiment of the present disclosure further provides a network device 1400, including: a first sending module 1401, configured to send DCI on the PDCCH based on indication information for the PDCCH monitoring periodicity.

The indication information includes a first PDCCH monitoring periodicity; or the indication information includes a first PDCCH monitoring periodicity and a second PDCCH monitoring periodicity.

When the indication information further includes a second PDCCH monitoring periodicity, the second PDCCH monitoring periodicity is used to enable the terminal to monitor the second PDCCH in a monitoring slot belonging to the second PDCCH monitoring periodicity when the terminal does not detect the first PDCCH in the monitoring slot belonging to the first PDCCH monitoring periodicity.

Further, after the first sending module 1401 sends the downlink control information DCI on the PDCCH based on the indication information for the PDCCH monitoring periodicity, the network device further includes: a second sending module, configured to, if no response message of DCI transmitted by the terminal or PUSCH is received at the corresponding position, send the DCI to the terminal in a monitoring slot which is the first slot belonging to the second PDCCH monitoring periodicity.

Further, after the first sending module 1401 sends the DCI on the PDCCH based on the indication information for the PDCCH monitoring periodicity, the network device further includes: an execution module, configured to, when there is no data scheduling in a slot in which the first PDCCH is located or a slot in which the second PDCCH is located, perform one of the following processes: not sending DCI; and sending DCI, wherein the DCI indicates the terminal not to monitor the PDCCH in continuous predefined number of slots.

It should be noted that the network device is a network device corresponding to the above-mentioned physical downlink control channel monitoring indication method applied to the network device side. All the implementations of the above-mentioned embodiments are applicable to the network device, and can also achieve the same technical effect.

An embodiment of the present disclosure further provides a network device, including a memory, a processor, and a computer program stored in the memory and executed by the processor. When the computer program is executed by the processor, each of the processes in the physical downlink control channel monitoring indication method described above is implemented, and the same technical effect can be achieved. To avoid repetition, details are not described herein.

An embodiment of the present disclosure further provides a computer-readable storage medium, wherein a computer program is stored on the computer-readable storage medium, and the computer program, when executed by a processor, implements various processes in the above-described physical downlink control channel monitoring and indicating method, and achieves the same technical effect. To avoid repetition, details are not described herein. The computer-readable storage medium includes a Read-Only Memory (ROM), a Random Access Memory (RAM), a magnetic disk, an optical disk, and the like.

Figure 15:
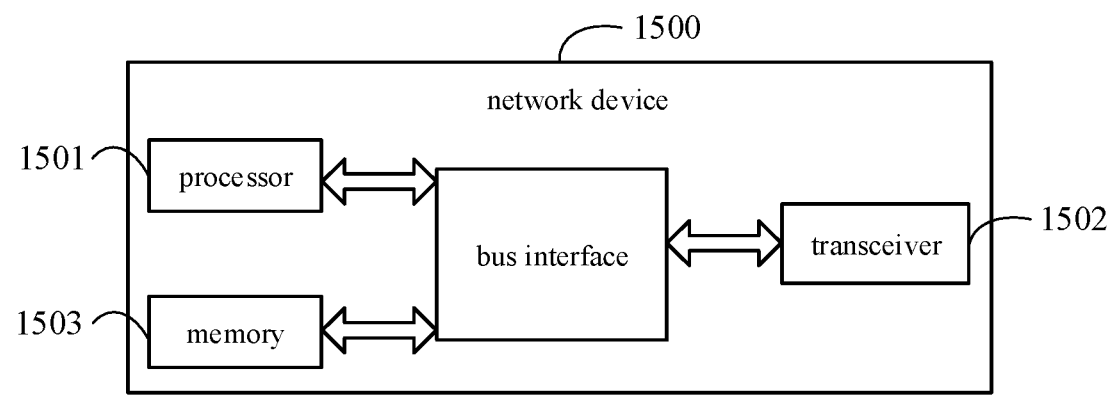
FIG. 15 is a structural block diagram showing a network device according to an embodiment of the present disclosure.

FIG. 15 is a structural diagram of a network device according to an embodiment of the present disclosure. Details of the above-described method applied to a network device side can be realized, and the same effect can be achieved. As shown in FIG. 15, the network device 1500 includes a processor 1501, a transceiver 1502, a memory 1503, and a bus interface.

The processor 1501 reads a program in the memory 1503 and executes the following processes: sending DCI on the PDCCH based on indication information for the PDCCH monitoring periodicity.

The indication information includes a first PDCCH monitoring periodicity; or the indication information includes a first PDCCH monitoring periodicity and a second PDCCH monitoring periodicity.

When the indication information further includes a second PDCCH monitoring periodicity, the second PDCCH monitoring periodicity is used to enable the terminal to monitor the second PDCCH in a monitoring slot belonging to the second PDCCH monitoring periodicity when the terminal does not detect the first PDCCH in the monitoring slot belonging to the first PDCCH monitoring periodicity.

In FIG. 15, the bus architecture may include any number of interconnected buses and bridges, specifically to connect various circuits of one or more processors represented by processor 1501 and one or more memories represented by memory 1503. The bus architecture may also link various other circuits, such as peripherals, voltage regulators, and power management circuits, all of which are well known in the art and therefore will not be described further herein. The bus interface provides an interface. Transceiver 1502 may be a plurality of elements, including a transmitter and a receiver, providing units for communicating with various other devices on a transmission medium.

The processor 1501 is responsible for managing the bus architecture and general processing, and the memory 1503 may store data used by the processor 1501 to perform operations.

Optionally, the processor 1501 reads and executes a program in the memory 1503, so as to: if no response message of DCI transmitted by the terminal or PUSCH is received at the corresponding position, send the DCI to the terminal in a monitoring slot which is the first slot belonging to the second PDCCH monitoring periodicity.

Optionally, the processor 1501 reads and executes a program in the memory 1503, so as to: when there is no data scheduling in a slot in which the first PDCCH is located or a slot in which the second PDCCH is located, perform one of the following processes: not sending DCI; and sending DCI, wherein the DCI indicates the terminal not to monitor the PDCCH in continuous predefined number of slots.

According to the network device of the embodiment of the present disclosure, DCI is sent on the PDCCH based on the indication information for the PDCCH monitoring periodicity, so that power consumption caused by monitoring the PDCCH on each slot of the terminal is avoided, and the PDCCH monitoring delay is also reduced.

The network device may be a Base Transceiver Station (BTS) in Global System of Mobile communication (GSM) or Code Division Multiple Access (CDMA), or may be a NodeB (NB) in Wideband Code Division Multiple Access (WCDMA), or may be an Evolutional Node B (eNB or eNodeB) in LTE, or a relay station or access point, or a base station in a future 5G network, or the like, and is not limited herein.

It is to be noted that, in this description, the terms "comprises," "comprising," or any other variation thereof, are intended to cover a non-exclusive inclusion, such that a process, method, article, or apparatus that includes a series of elements includes not only those elements but also other elements not expressly listed, or also includes elements inherent to such process, method, article, or apparatus. Without more limitations, an element defined by the phase "include a . . . " does not exclude there are additional identical elements in a process, method, article, or apparatus that includes the element.

From the above description of the embodiments, it will be apparent to a person skilled in the art that the method of the above embodiments may be implemented by means of software plus the necessary general hardware platform, but may be implemented by means of hardware, but in many cases the former is preferred. Based on such an understanding, the technical solution of the present disclosure may be embodied in the form of a software product stored in a storage medium (such as a ROM/RAM, a magnetic disk, or an optical disk) including indications for causing a terminal (which may be a mobile phone, a computer, a server, an air conditioner, or a network device) to perform the methods described in the various embodiments of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A Physical Downlink Control Channel (PDCCH) monitoring method, comprising:
   acquiring indication information for a PDCCH monitoring periodicity, wherein the indication information comprises a first PDCCH monitoring periodicity;
   monitoring the first PDCCH in a monitoring slot belonging to the first PDCCH monitoring periodicity; and
   when the first PDCCH is not detected in the monitoring slot belonging to the first PDCCH monitoring periodicity, monitoring the PDCCH in a next slot including a PDCCH resource set; or when the indication information further includes a second PDCCH monitoring periodicity and the first PDCCH is not detected in the monitoring slot belonging to the first PDCCH monitoring periodicity, monitoring a second PDCCH in a monitoring slot belonging to the second PDCCH monitoring periodicity.

2. The PDCCH monitoring method according to claim 1, wherein acquiring the first PDCCH monitoring periodicity comprises:
   receiving the first PDCCH monitoring periodicity sent by a network device; or
   acquiring the first PDCCH monitoring periodicity defined by a network protocol.

3. The PDCCH monitoring method according to claim 1, wherein acquiring the second PDCCH monitoring periodicity comprises:
   receiving the second PDCCH monitoring periodicity sent by a network device; or
   acquiring the second PDCCH monitoring periodicity defined by a network protocol.

4. The PDCCH monitoring method according to claim 1, wherein
   downlink control information (DCI) in the first PDCCH is used to indicate at least one of: a slot in which a third PDCCH to be monitored by the terminal is located and a time-frequency domain resource in which the third PDCCH is located;
   when the indication information further includes the second PDCCH monitoring periodicity, the DCI in the second PDCCH is used to indicate at least one of: the slot in which the third PDCCH to be monitored by the terminal is located and the time-frequency domain resource in which the third PDCCH is located;
   the second PDCCH monitoring periodicity is the same as or different from the first PDCCH monitoring periodicity.

5. The PDCCH monitoring method according to claim 4, wherein
   the number of DCI bits in the second PDCCH is less than the number of DCI bits in the first PDCCH; or
   a physical resource block allocation and modulation coding scheme of the second PDCCH is the same as a physical resource block allocation and modulation coding scheme of the first PDCCH, the first PDCCH is used for indicating the third PDCCH.

6. The PDCCH monitoring method according to claim 4, wherein
   the DCI in the first PDCCH includes at least one bit for indicating whether the terminal needs to monitor the third PDCCH in the first slot, and if the third PDCCH is transmitted in the first slot, the DCI in the third PDCCH transmitted in the first slot includes at least one bit for indicating whether the terminal needs to monitor the third PDCCH in the second slot; or
   the DCI in the first PDCCH includes at least one bit for indicating slot(s) that the terminal does not monitoring the third PDCCH and the slot(s) is between the first PDCCH and a next first PDCCH.

7. The PDCCH monitoring method according to claim 4, wherein when the indication information further includes the second PDCCH monitoring periodicity, the method further comprises:
   when the first target PDCCH is not received in the slot indicated by a network device or defined by a network protocol, monitoring the PDCCH in a first predefined monitoring slot belonging to the second PDCCH monitoring periodicity;
   wherein the first predefined monitoring slot is the first monitoring slot that belongs to the second PDCCH monitoring periodicity after the terminal does not receive the first target PDCCH; or
   determining a monitoring slot which is the first slot belonging to the second PDCCH monitoring periodicity after a predetermined time as a first predefined monitoring slot, wherein the predetermined time is the time at which the network device retransmits the DCI through the PDCCH after the network device determines that the terminal does not receive the first target PDCCH of downlink grant or uplink grant,
   wherein the first target PDCCH is one of the first PDCCH, the second PDCCH, and the third PDCCH.

8. The PDCCH monitoring method according to claim 4, wherein
   when a second target PDCCH indicate the terminal to skip monitoring the first PDCCH and to monitor the following PDCCH after the first PDCCH,
   after the terminal receives the second target PDCCH, the terminal monitors the PDCCH following the skipped first PDCCH,
   the second target PDCCH includes one of the first PDCCH, the second PDCCH, and the third PDCCH.

9. The PDCCH monitoring method according to claim 4, wherein
   when a third target PDCCH cannot indicate the terminal to skip monitoring the first PDCCH and to monitor the following PDCCH after the first PDCCH to monitor, if the third target PDCCH indicate the terminal to skip monitoring the first PDCCH and to monitor the following PDCCH after the first PDCCH to monitor, the terminal continues to monitor the next first PDCCH, the third target PDCCH is at least one of the first PDCCH, the second PDCCH, and the third PDCCH.

10. The PDCCH monitoring method according to claim 4, wherein
DCI in a fourth target PDCCH is group common DCI and/or UE specific DCI;
the slot is a short slot or a normal slot;
the fourth target PDCCH is at least one of the first PDCCH, the second PDCCH, and the third PDCCH.

11. The PDCCH monitoring method according to claim 1, wherein the monitoring the first PDCCH in a monitoring slot belong to the first PDCCH monitoring periodicity comprises:
monitoring the PDCCH based on a first predefined periodicity length of the first PDCCH monitoring periodicity, and monitoring the PDCCH based on a second predefined periodicity length of the first PDCCH monitoring periodicity after the PDCCH is detected;
when receiving a monitoring periodicity length change indication, replacing the first predefined periodicity length of the first PDCCH monitoring periodicity by a third predefined periodicity length to monitor the PDCCH;
when a counter reaches a predefined threshold, replacing the first predefined periodicity length of the first PDCCH monitoring periodicity by a fourth predefined periodicity length to monitor the PDCCH;
wherein the first predefined periodicity length is greater than the second predefined periodicity length, and the fourth predefined periodicity length is greater than the first predefined periodicity length, the counter counts the number of slots in which no PDCCH is detected, and if the PDCCH is detected in one slot, the counter is reset to zero, the predefined threshold is predefined by a network protocol or a slot number threshold configured by a network device.

12. The PDCCH monitoring method according to claim 11, wherein
when the monitoring periodicity length change indication is received, and the first predefined periodicity length of the first PDCCH monitoring periodicity is replaced by the third predefined periodicity length to monitor the PDCCH, the monitoring periodicity length change indication is indicated by DCI, Medium Access Control Control Element (MAC CE), or Radio Resource Control (RRC) signaling.

13. The PDCCH monitoring method according to claim 11, wherein
a value of the periodicity length of the first PDCCH monitoring periodicity belongs to a set $\{T1_0, T1_1, \ldots, T1_{K-1}\}$,
$T1_{i+1} = A \times T1_i$, $T1_{i+1}$ is a value of the (i+1)th periodicity length, $T1_i$ is a value of the (i)th periodicity length, $i=0, 1, 2 \ldots, K-2$, K is a total sum of period lengths in the set, and A is a positive integer greater than or equal to 2.

14. A terminal, comprising a memory, a processor, and a computer program stored in the memory and executed by the processor, wherein the processor is configured to execute the computer program so as to implement the steps of:
acquiring indication information for a PDCCH monitoring periodicity, wherein the indication information comprises a first PDCCH monitoring periodicity;
monitoring the first PDCCH in a monitoring slot belonging to the first PDCCH monitoring periodicity; and
when the first PDCCH is not detected in the monitoring slot belonging to the first PDCCH monitoring periodicity, monitoring the PDCCH in a next slot including a PDCCH resource set; or
when the indication information further includes a second PDCCH monitoring periodicity and the first PDCCH is not detected in the monitoring slot belonging to the first PDCCH monitoring periodicity, monitoring a second PDCCH in a monitoring slot belonging to the second PDCCH monitoring periodicity.

15. The terminal according to claim 14, wherein the processor is configured to implement the steps of:
receiving the first PDCCH monitoring periodicity sent by a network device; or acquiring the first PDCCH monitoring periodicity defined by a network protocol; or
receiving the second PDCCH monitoring periodicity sent by a network device; or acquiring the second PDCCH monitoring periodicity defined by a network protocol.

16. The terminal according to claim 14, wherein the processor is configured to implement the steps of:
monitoring the PDCCH based on a first predefined periodicity length of the first PDCCH monitoring periodicity, and monitoring the PDCCH based on a second predefined periodicity length of the first PDCCH monitoring periodicity after the PDCCH is detected;
when receiving a monitoring periodicity length change indication, replacing the first predefined periodicity length of the first PDCCH monitoring periodicity by a third predefined periodicity length to monitor the PDCCH;
when a counter reaches a predefined threshold, replacing the first predefined periodicity length of the first PDCCH monitoring periodicity by a fourth predefined periodicity length to monitor the PDCCH;
wherein the first predefined periodicity length is greater than the second predefined periodicity length, and the fourth predefined periodicity length is greater than the first predefined periodicity length, the counter counts the number of slots in which no PDCCH is detected, and if the PDCCH is detected in one slot, the counter is reset to zero, the predefined threshold is predefined by a network protocol or a slot number threshold configured by a network device.

17. The terminal according to claim 14, wherein,
downlink control information on (DCI) in the first PDCCH is used to indicate at least one of: a slot in which a third PDCCH to be monitored by the terminal is located and a time-frequency domain resource in which the third PDCCH is located;
when the indication information further includes the second PDCCH monitoring periodicity, the DCI in the second PDCCH is used to indicate at least one of: the slot in which the third PDCCH to be monitored by the terminal is located and the time-frequency domain resource in which the third PDCCH is located;
the second PDCCH monitoring periodicity is the same as or different from the first PDCCH monitoring periodicity.

18. A non-transitory computer readable storage medium storing therein a computer program, wherein the computer program is executed by a processor so as to implement steps of:
acquiring indication information for a PDCCH monitoring periodicity, wherein the indication information comprises a first PDCCH monitoring periodicity;

monitoring the first PDCCH in a monitoring slot belonging to the first PDCCH monitoring periodicity; and when the first PDCCH is not detected in the monitoring slot belonging to the first PDCCH monitoring periodicity, monitoring the PDCCH in a next slot including a PDCCH resource set; or when the indication information further includes a second PDCCH monitoring periodicity and the first PDCCH is not detected in the monitoring slot belonging to the first PDCCH monitoring periodicity, monitoring a second PDCCH in a monitoring slot belonging to the second PDCCH monitoring periodicity.

19. The non-transitory computer-readable storage medium according to claim 18, wherein the computer program is executed by the processor so as to implement steps of:

receiving the first PDCCH monitoring periodicity sent by a network device; or acquiring the first PDCCH monitoring periodicity defined by a network protocol; or receiving the second PDCCH monitoring periodicity sent by a network device; or acquiring the second PDCCH monitoring periodicity defined by a network protocol.

20. The non-transitory computer-readable storage medium according to claim 18, wherein the computer program is executed by the processor so as to implement steps of:

monitoring the PDCCH based on a first predefined periodicity length of the first PDCCH monitoring periodicity, and monitoring the PDCCH based on a second predefined periodicity length of the first PDCCH monitoring periodicity after the PDCCH is detected;

when receiving a monitoring periodicity length change indication, replacing the first predefined periodicity length of the first PDCCH monitoring periodicity by a third predefined periodicity length to monitor the PDCCH;

when a counter reaches a predefine threshold, replacing the first predefined periodicity length of the first PDCCH monitoring periodicity by a fourth predefined periodicity length to monitor the PDCCH;

wherein the first predefined periodicity length is greater than the second predefined periodicity length, and the fourth predefined periodicity length is greater than the first predefined periodicity length, the counter counts the number of slots in which no PDCCH is detected, and if the PDCCH is detected in one slot, the counter is reset to zero, the predefined threshold is predefined by a network protocol or a slot number threshold configured by a network device.

* * * * *